United States Patent [11] 3,633,427

[72] Inventor Larry A. Wilhelm, Lansing, Mich.
[21] Appl. No. 27,002
[22] Filed Apr. 9, 1970
[45] Patented Jan. 11, 1972
[73] Assignee FMC Corporation, San Jose, Calif.

[54] VEHICLE WHEEL SPINNER
17 Claims, 5 Drawing Figs.

[52] U.S. Cl. .................................................. 74/16
[51] Int. Cl. .................................................. F16m 3/00
[50] Field of Search .................................... 74/16; 73/457; 192/4

[56] References Cited
UNITED STATES PATENTS

| | | | |
|---|---|---|---|
| 3,030,815 | 4/1962 | Lill et al. | 74/16 |
| 3,105,387 | 10/1963 | Shoemaker et al. | 74/16 |
| 2,018,160 | 10/1935 | Weaver | 74/16 |

Primary Examiner—William F. O'Dea
Assistant Examiner—F. D. Shoemaker
Attorneys—F. W. Anderson, C. W. Tripp and W. W. Burns ABSTRACT: A wheel spinner device has legs which, on actuation, tilt the frame of the device to urge a rotating drum thereon into the vehicle wheel to be spun. Wheels on the frame are locked by pawl and ratchet to hold the drum against the vehicle wheel during spinning. A brake member on the front of the frame swings, when actuated, into braking engagement with the spinning wheel after the drum is withdrawn.

FIG_1

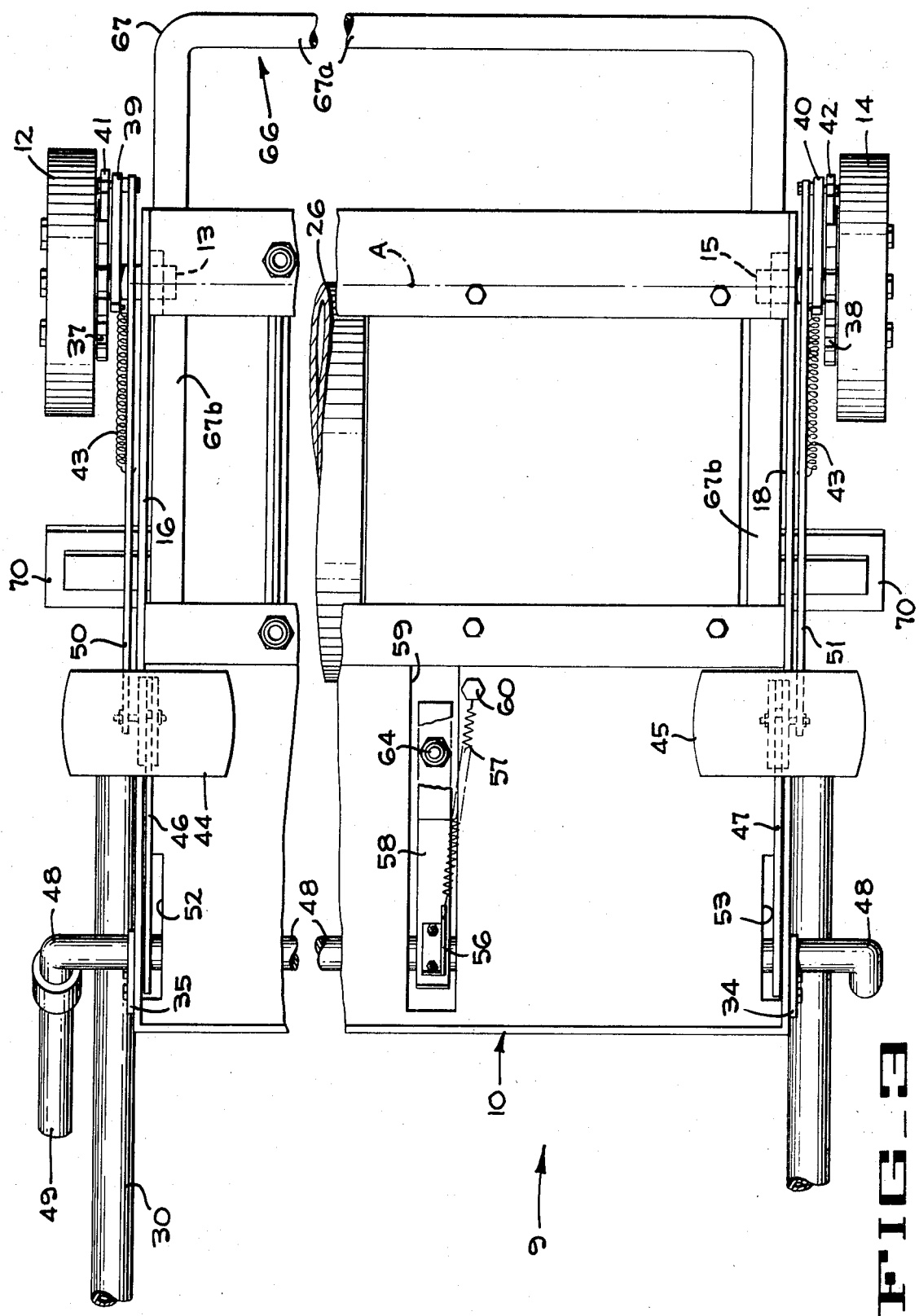

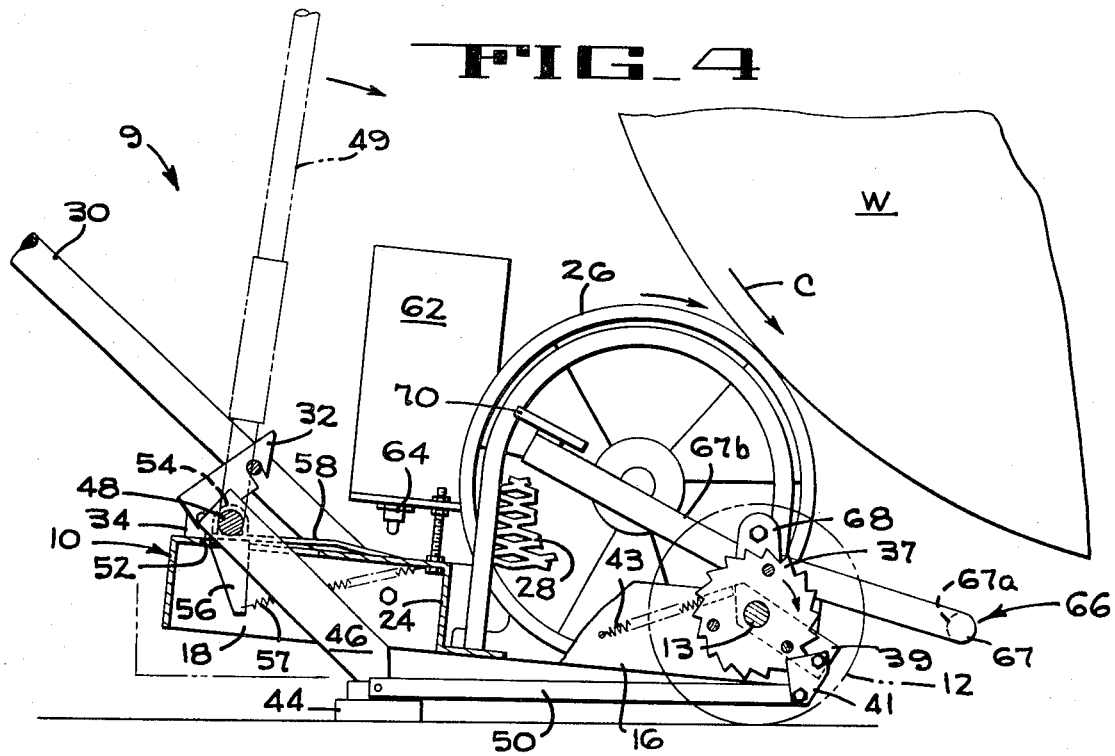
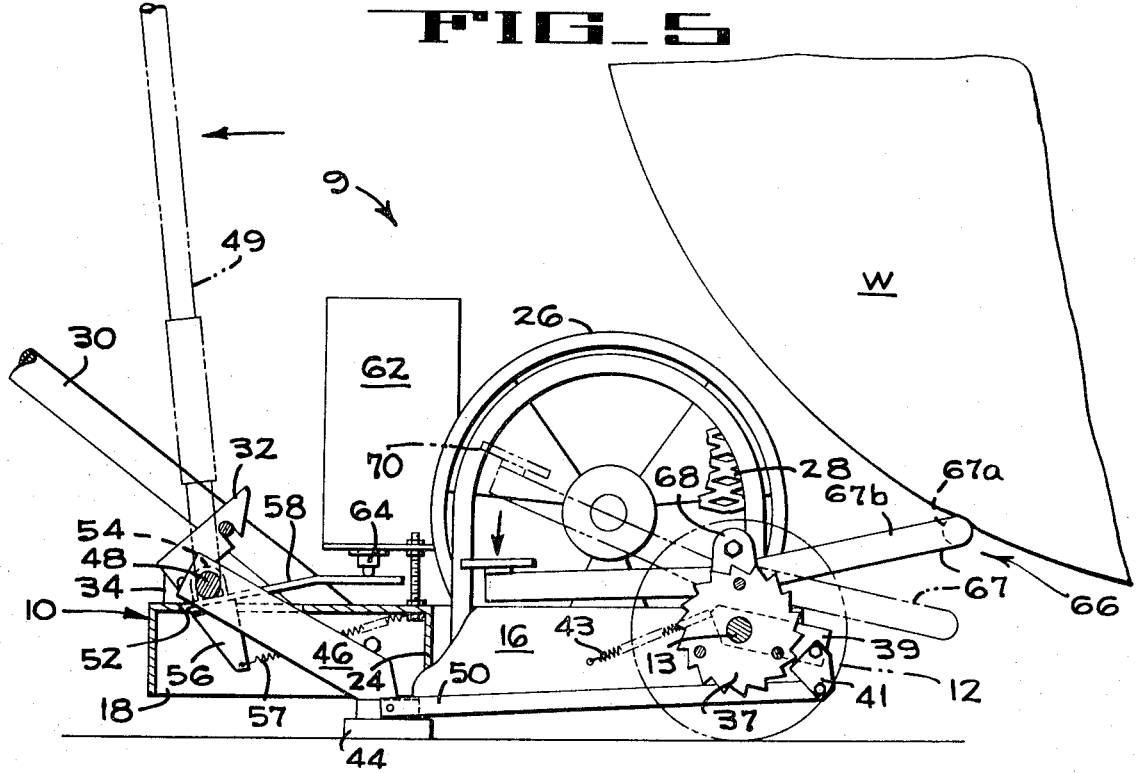

VEHICLE WHEEL SPINNER

BACKGROUND OF THE INVENTION

The present invention relates to automotive service equipment and more particularly to portable wheel spinners. As a first step in an on-the-car balancing operation of an automobile or truck wheel, the wheel is first jacked up and is then driven, for instance, by use of a portable wheel spinner to rotate or spin the wheel to obtain a relatively high speed at which its unbalance becomes most pronounced. When using known wheel spinners for this purpose, certain conditions, inherent to some extent, in all automobile tires, contribute to the difficulty of maintaining constant or nearly constant driving engagement between the drum of the wheel spinner, and the tread of the tire. In addition to unbalance, which is probably the most common of these conditions, the road engaging surface of the tire may be out of round and there may be variations in the stiffness of the tire's casing.

During the wheel-spinning operation, any area of the tire in which any of these conditions exist, will, upon striking the drum, impose a momentary force thereon during each revolution of the tire, tending to propel the drive drum out of driving engagement with the tire. Such a force cyclically applied to the drum tends to repeatedly propel the drum out of driving engagement with the tire and in so doing shakes or vibrates the wheel spinner and moves it out of operating position. As rotation of the wheel is accelerated, both the frequency and the force at which the drum is struck by such an area of the tire is increased, therefore the drum makes only intermittent driving engagement with the tire of the automobile or truck. The entire wheel spinner is vibrated with such force that it is difficult to hold it in operational position. For these reasons, the task of holding such a wheel spinner in position to maintain even poor engagement between the drum and the tire is laborious. In addition, the time required for the wheel to obtain the desired speed is greater than would be necessary if the wheel spinner were not moved about and if engagement between the drum and tire were more nearly constant.

Therefore an object of the present invention is to provide an improved wheel spinner. A further object is to provide improved means in a wheel spinner to maintain nearly constant engagement between the spinning drum thereof and the tire during wheel-spinning operations.

SUMMARY OF THE INVENTION

The present invention relates to a wheel-spinning device which in the preferred embodiment of the invention, includes a drum or wheel-spinning element mounted on the shaft of an electric motor that is secured to a frame. A pair of wheels are mounted on the front section of the frame. Ratchet wheels are attached to the inner surfaces of the front wheels, and pawls, mounted to be swung into engagement with the ratchet wheels, are incorporated to rotate the wheels to advance the carriage into the vehicle wheel and to impede rotation of the front wheels away from the vehicle wheel being spun. A pair of legs, or feet, are swung from a pair of lever arms which are rigidly attached to an actuator arm, or control stick, at the rear of the carriage. The feet or elevating means, are pivoted from a first position in contact with the undersurface of the frame of the wheel spinner to a lowered position which raises the rear end of the frame about the axis of the wheels and pushes the drum of the wheel spinner into the vehicle wheel. A pair of rods are connected between the lever arms (which support the feet) and the pawls which engage the ratchet wheels of the front wheels. This connection between the pawls which advance and lock the front wheels and the lever arms on which the feet are swung allows an operator simultaneously to advance the carriage toward the vehicle tire, lock the front wheels from rotation in a direction away from the vehicle tire, to raise the rear of the carriage thus pushing the drum into the vehicle wheel, and to start the wheel spinner motor. These three functions are achieved by one simple pull on a control stick. As the wheel-spinning operation is completed, a simple lever arm brake on the forward end of the frame of the wheel spinner is forced up and into the vehicle wheel, bringing its rotation to a halt.

BRIEF DESCRIPTION OF THE DRAWINGS

FIG. 3 is a bottom plan view of the wheel spinner taken looking in the direction of arrows 3—3 of FIG. 2, with portions broken away for clarity.

FIG. 4 is a side elevation of the wheel spinner in operation, taken as the view of FIG. 2 with portions broken away for clarity.

FIG. 5 is a side elevation of the wheel spinner in braking position with portions removed for clarity.

DESCRIPTION OF THE PREFERRED EMBODIMENT

Figure 1:
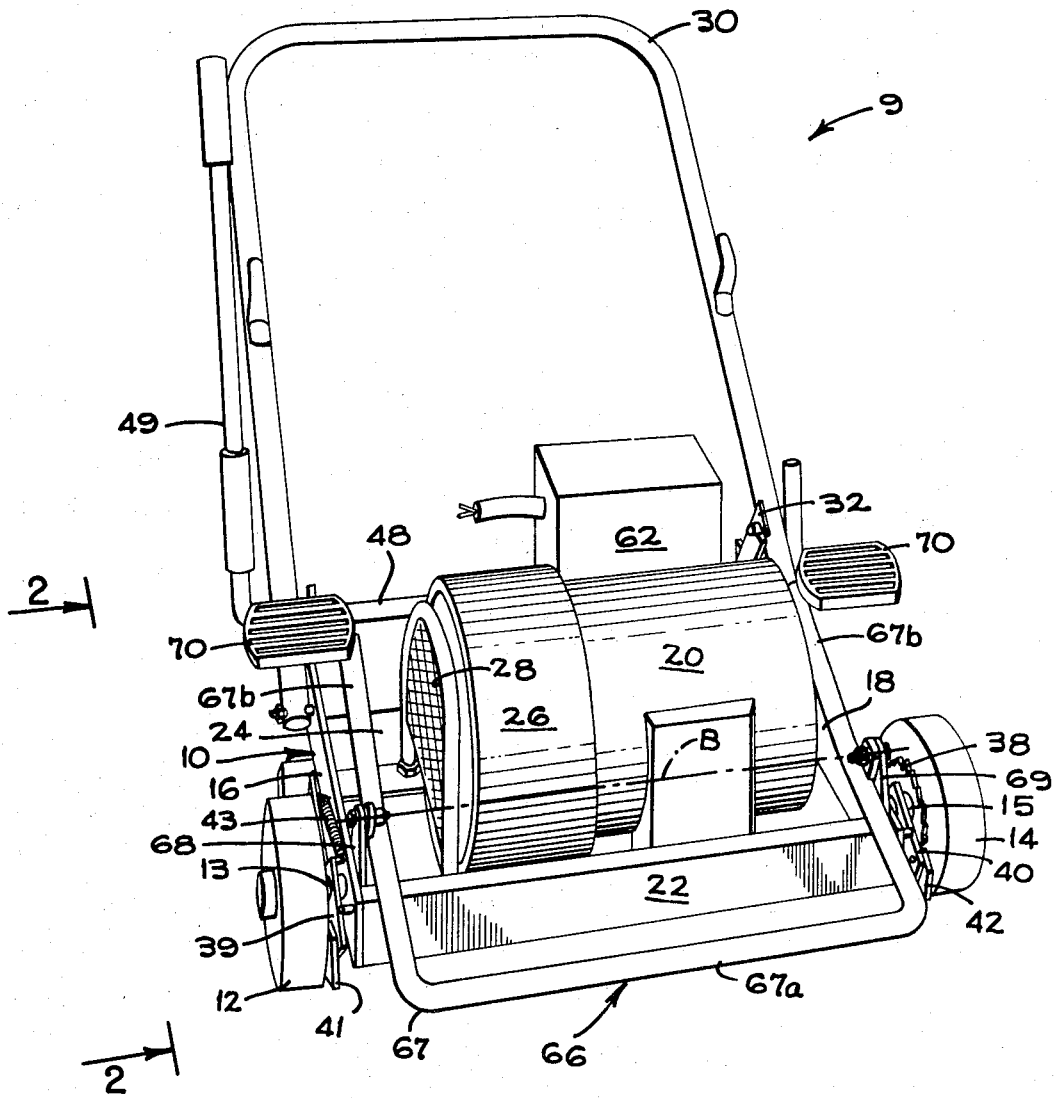
FIG. 1 is a perspective drawing of the wheel spinner as viewed from the front.

The wheel spinner 9 of the present invention includes a frame 10 (FIGS. 1–5) having a pair of wheels, or roller means, 12 and 14 mounted for rotation on shafts 13 and 15 (FIG. 3) which are mounted in side panels 16 and 18 of the frame 10 at the forward end thereof on a transverse axis A.

A constant speed electric motor 20 (FIG. 1) is mounted between oppositely facing frame members 22 and 24 such that the shaft of the motor is in horizontal orientation parallel to the axis A. The drum, or spinning element 26, which contacts the vehicle wheel during spinning operations, is mounted on the shaft (not shown) of the electric motor. A screened semicircular guard 28 is anchored to the frame 10 at the open end of the drum 26 to protect the operator.

A U-shaped handle 30 is pivotally mounted to the rear of the frame 10. The handle 30 is locked in the inclined position shown in FIG. 2 by a slotted ear 32 which is pivotally mounted on a plate 34 that is attached to the frame side panel 18 at the rear of the frame 10. The handle 30 is used to push or pull the wheel spinner to and from the work place and position the drum in front of the vehicle wheel.

A ratchet wheel 37, 38 is attached to the inner surface of each of the front wheels 12 and 14. Two like pawls, or dogs, 41 and 42 are designed to be swung, respectively, into engagement with the teeth of the ratchet wheels 37 and 38. The action of the pawls rotates the ratchet wheels, and consequently the ground-engaging wheels are rotated to move the frame toward the vehicle wheel and force the spinning element into the vehicle wheel. The pawls also hold the wheels 12 and 14 against rotation away from the vehicle wheel W which is being spun (FIG. 4). The pawls 41, 42 are pivotally swung on pivot links 39 and 40 which, in turn, are rotatable on the shafts 13 and 15 of the wheels. Springs 43 connected between the links 39, 40 and the frame hold the pawls in engagement with the ratchet wheels while the vehicle wheel is being spun.

Figure 2:
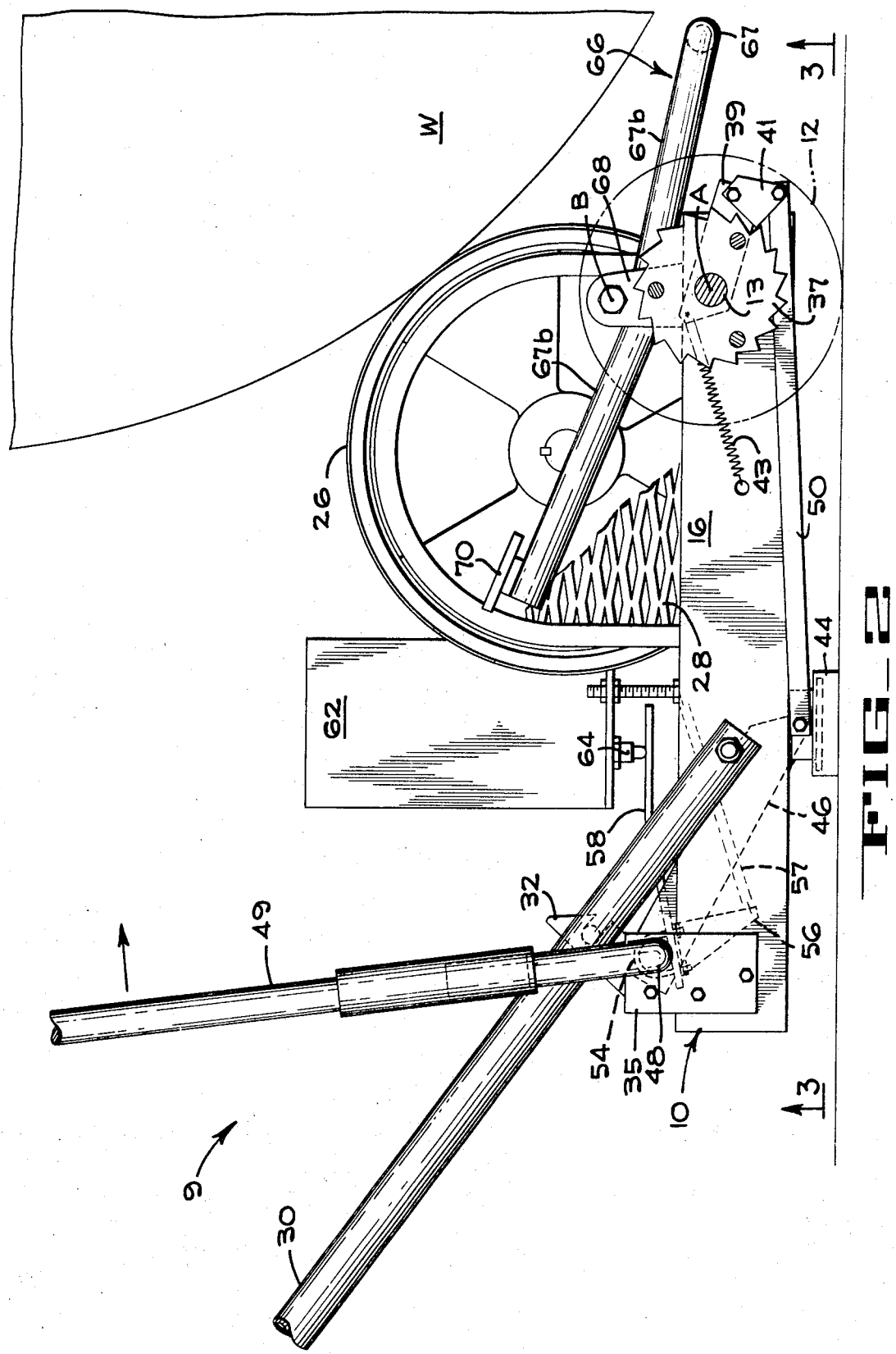
FIG. 2 is an enlarged fragmentary side elevation of the wheel spinner in a nonoperating condition, looking in the direction of arrows 2—2 of FIG. 1, with portions broken away for clarity.

A pair of feet, 44 and 45, with rubber pads covering their lower surfaces, is mounted for movement relative to the frame and the wheels from the relative position shown in FIG. 2 to that shown in FIG. 4. The feet 44 and 45 are pivotally attached at the ends of legs 46 and 47 which extend through slots 52 and 53 in the frame and which are rigidly connected to an actuator rod 48. The actuator rod, a U-shaped member, extends transversely across the frame and is anchored for rotation in the upstanding plates 34 and 35 which are attached to the frame side panels 16 and 18 towards the rear of the frame. A handle 49 slides over either end of the actuator rod 48 and can be used to control the wheel spinner from either side of the frame. When the actuator rod 48 is pivoted forwardly by the handle 49, the legs 46, 47 and feet 44, 45 act as an elevating, means or members, to lift the rear of the frame and urge the drum into the vehicle wheel. The rubber-covered feet, which have a high-friction surface, grip the ground and resist retraction from the vehicle wheel.

Rods 50 and 51 are pivotally connected at one end to the pawls 41, 42 which advance and lock the front wheels and are pivotally connected at the opposite ends to legs 46 and 47 which swing the feet 44 and 45 into their lowered position. The interconnection of the front wheel pawls with the lowering mechanism of the feet 44 and 45 allows an operator to advance and lock the front wheels while simultaneously lowering the feet, all with one simple movement of the actuator rod 48. When the wheels are locked, they provide additional resistance to retraction from the vehicle wheel so that the drum is held firmly and continuously against the vehicle wheel by virtue of the four-point ground contact made by the feet and the wheels.

As shown best in FIGS. 2 and 3, a spring return arm 56 and the switch lever 58 are attached to the actuator rod 48 by means of a U-bolt 54 near the center of the actuator rod. The spring return arm 56 depends into a slot 59 which is cut into the frame 10. A spring 57, attached between the lower end of the spring return arm 56 and a bolt 60 that is mounted in the frame 10, creates a torque on the actuator rod 48 which tends to rotate the rod in a counterclockwise direction (as viewed in FIG. 2) to a rear position as shown in FIG. 2. When the wheel spinner is away from the vehicle wheel with the actuator rod in the rear position, switch lever 58, also attached to the actuator rod 48 by means of the U-bolt 54, depresses the normally closed switch 64, which is connected to the relay box 62 of the motor, to hold the switch contacts open. When the actuator rod 48 is swung clockwise to a forward position, as shown in FIG. 4, the switch 64 is released to close the contacts thereof. As the contacts close the motor 20 is energized to spin the drum 26.

A brake 66 for stopping rotation of the vehicle wheel is mounted at the forward end of the frame as viewed in FIGS. 2 and 3. The brake 66 has a U-shaped member 67 with crossmember 67a and rearwardly extending legs 67b. The legs are pivotally connected on a pivot axis B to ears 68, 69 which are connected to and extend upwardly from the frame. Pedals 70 are mounted on each leg 67b behind the pivot axis. When either of the pedals 70 is depressed, the crossmember 67a of the U-shaped member 67 is raised into braking contact with the vehicle wheel W. The U-shaped member of the brake mechanism is counterbalanced such that when the brake is not in use it assumes the orientation as shown in FIG. 2.

To use the wheel spinner, the vehicle is first jacked up so that the wheel to be spun is free from contact with the ground. The wheel spinner is then moved into position with the drum 26 in front of the wheel. The handle 49 of the actuator rod 48 is then pushed forward to the position shown in FIG. 4, to perform several functions with one motion. The feet 44 and 45 are lowered relative to the frame to raise the rear section of the frame (thus inclining the frame) about the wheels and force the drum 26 into the wheel to be spun. Simultaneously, the pawls, or dogs, 41 and 42 are swung into contact with the ratchet wheels 37 and 38 on the ground-engaging wheels and held tightly in engagement with the teeth of the ratchet wheels by the springs 43 which are attached between the pivot links 39 and 40 and frame side panel 16 and 18. The pawls when actuated, rotate the ratchet wheels and the ground-engaging wheels, to which the ratchet wheels are attached, moving the frame toward the vehicle wheel and forcing the drum into contact with the vehicle wheel. The pawls also lock the ground-engaging wheels against rotation in a direction away from the wheel which is to be spun so that the ground-engaging wheels can only be moved in a direction into the wheel, or to the right in FIG. 4. At the same instant that the pawls engage the ratchet wheels at the front wheels and the feet 44 and 45 are lowered, the switch lever 58, which is also attached to the actuator rod 48, swings away from the switch 64. The normally closed contacts of switch 64 now close to energize the motor which turns the drum 26 against the vehicle wheel. The vehicle wheel W is spun in the direction as shown by the arrow C in FIG. 4.

When the spinning operation is completed, the control handle 49 is pulled back in a counter clockwise direction as shown in FIG. 5, thus disengaging the pawls from the front wheels and lowering the rear of the frame while simultaneously shutting off the motor and stopping the drum 26 as the switch 64 is again depressed. Either pedal 70 or the brake lever 66 is then depressed, swinging the crossmember 67a of the brake up into the vehicle wheel to halt the rotation of the vehicle wheel.

Although the best mode contemplated for carrying out the present invention has been herein shown and described, it will be apparent that modification and variation may be made without departing from what is regarded to be the subject matter of the invention.

What I claim is:

1. A portable wheel spinning device comprising, in combination, a frame, a spinning element mounted on the frame, means to drive the spinning element, roller means on the frame to advance and retract the frame with respect to the wheel, means to lock the roller means against retraction from the wheel including pawl means and ratchet means engaged by the pawl means, and means selectively to actuate the locking means for the roller means.

2. A portable wheel-spinning device comprising, in combination, a frame, a spinning element on the frame, means to drive the spinning element, roller means on the frame to advance and retract the frame with respect to the wheel, elevating means attached to the frame to urge the spinning element into the wheel, means to lock the roller means against retraction from the wheel, and means to actuate said elevating means and said means to lock the roller means simultaneously.

3. The apparatus of claim 2 wherein said elevating means is leg means which when actuated rotates the frame through an arc about the roller means.

4. The apparatus of claim 3 including feet on said leg means to grip the ground and resist retraction from the wheel.

5. The apparatus of claim 2 wherein said means to lock the roller means includes a ratchet wheel engaged by a pawl.

6. A portable wheel spinning device comprising in combination, a frame, a spinning element on the frame, means to drive the spinning element, roller means on the frame to advance and retract the frame with respect to the wheel, elevating means to incline the frame about the roller means to urge the spinning element into the wheel, a ratchet mounted for rotation with the roller means, a pawl operable when actuated to engage the ratchet and lock the roller means against retraction from the wheel, and means selectively to actuate the elevating means and the pawl simultaneously.

7. A portable wheel-spinning device of the type used to spin vehicle wheels comprising, in combination, a frame, a spinning element on the frame, means to drive the spinning element, roller means on the frame to advance and retract the frame with respect to the vehicle wheel, a leg on the frame operable when actuated to incline the frame about the roller means to urge the spinning element into the vehicle wheel, a ratchet mounted for rotation with the roller means, a pawl operable when actuated to engage the ratchet and lock the roller means against retraction from the vehicle wheel, and means selectively to actuate the leg and the pawl simultaneously.

8. The apparatus of claim 7 in which said leg has a foot, said foot having a high-friction surface to grip the ground and resist retraction from the vehicle wheel.

9. The device of claim 7 wherein said means to actuate the leg and the pawl includes a means connecting the leg and the pawl and an actuator rod connected to the leg.

10. A portable wheel-spinning device comprising in combination, a frame, a wheel-spinning drum on the frame, a motor to drive the wheel-spinning drum, roller means on the frame to advance and retract the frame with respect to the vehicle wheel, a leg on the frame operable when actuated to incline the frame about the roller means to urge the spinning element into the vehicle wheel, a ratchet mounted for rotation with the roller means, a pawl operable when actuated to engage the ratchet and lock the roller means against retraction from the wheel, a member connecting the leg and the pawl to transmit actuating motion, and means selectively to actuate the leg and the pawl simultaneously.

11. A portable wheel-spinning device of the type used to spin a vehicle wheel, a frame, a wheel-spinning drum on the frame, a motor to drive the wheel-spinning drum, ground-engaging wheels rotatably secured to the frame to advance and retract the frame with respect to the vehicle wheel, a leg on the frame to incline the frame about the ground-engaging wheels to urge the spinning drum into the vehicle wheel, a ratchet mounted for rotation with the ground-engaging wheels, a pawl operable when actuated to engage the ratchet and lock the ground-engaging wheels against retraction from the vehicle wheel, a rod member connecting the leg and the pawl for transmitting actuation, and an actuator rod to selectively actuate the leg and the pawl simultaneously.

12. The apparatus of claim 9 in which a leg is provided on each side of the frame, feet on said legs, said feet having a high-friction surface to grip the ground when said wheels are locked to provide with the wheels four-point ground contact to resist retraction from the vehicle wheel.

13. A portable wheel-spinning device comprising, in combination, a frame, a spinning element on the frame, means to drive the spinning element, roller means on the frame to advance and retract the frame with respect to the wheel, elevating means on the frame for inclining the frame and spinning element toward the wheel, and means for rotating the roller means to advance the frame toward the wheel and force the spinning element into the wheel and for locking the roller means against movement away from the wheel.

14. A portable wheel-spinning device comprising, in combination, a frame, a spinning element on the frame, means to drive the spinning element, roller means on the frame to advance and retract the frame with respect to the wheel, means for rotating said roller means to advance the frame toward the wheel and force the spinning element into the wheel and for locking the roller means against retraction from the wheel.

15. The apparatus of claim 14 wherein said means for rotating said roller means to advance the frame toward the wheel and force the spinning element into the wheel and for locking the roller means against retraction from the wheel comprises a ratchet mounted for rotation with the roller means and a pawl, operable when actuated, to engage the ratchet and rotate the roller means to advance the frame toward the wheel and force the spinning element into the wheel, said pawl locking the roller means against retraction from the wheel.

16. A portable wheel-spinning device comprising in combination, a frame, a spinning element mounted on the frame, means to drive the spinning element, leg means on the frame, to incline and advance the frame toward the wheel to force the spinning element into the wheel when the leg means is lowered relative to the frame, roller means on the frame, a ratchet mounted for rotation with the roller means, and a pawl, operable when actuated to engage the ratchet and rotate the roller means to advance the frame toward the wheel.

17. A portable wheel-spinning device comprising in combination, a frame, ground-engaging roller members on the frame to advance the frame toward the wheel, a spinning element mounted on the frame, means to drive the spinning element, and elevating members spaced from said roller members to incline the frame toward the wheel and force the spinning element into the wheel.

* * * * *